United States Patent [19]

Stoddard

[11] 4,340,096
[45] Jul. 20, 1982

[54] FEED DEVICE AND METHOD FOR SUPPLYING FREE-FLOWING MATERIAL TO A CONTAINER

[75] Inventor: James R. Stoddard, Mold, Wales

[73] Assignee: J. Stoddard & Sons Limited, Clwyd, Wales

[21] Appl. No.: 199,827

[22] Filed: Oct. 23, 1980

[30] Foreign Application Priority Data

Oct. 26, 1979 [GB] United Kingdom ............... 7937159

[51] Int. Cl.³ .............................................. B65B 1/04
[52] U.S. Cl. ...................................... 141/1; 141/129
[58] Field of Search ............................. 141/129, 1–12, 141/130–191

[56] References Cited

U.S. PATENT DOCUMENTS

| | | | |
|---|---|---|---|
| 503,029 | 8/1893 | Baker | 141/129 |
| 565,334 | 8/1896 | Dodge . | |
| 2,318,658 | 5/1943 | Alvey . | |
| 3,348,455 | 10/1967 | Williamson et al. | 141/129 |
| 3,536,111 | 10/1970 | Rasmusson | 141/129 |
| 3,842,967 | 10/1974 | Davis . | |

FOREIGN PATENT DOCUMENTS

| | | |
|---|---|---|
| 44662 | 10/1910 | Austria . |
| 29932 | 8/1922 | Denmark . |
| 67111 | 2/1893 | Fed. Rep. of Germany . |
| 218608 | 2/1910 | Fed. Rep. of Germany . |
| 938180 | 1/1919 | Fed. Rep. of Germany . |
| 482334 | 9/1929 | Fed. Rep. of Germany . |
| 1521967 | 8/1978 | United Kingdom . |
| 1553477 | 12/1979 | United Kingdom . |

*Primary Examiner*—Houston S. Bell, Jr.
*Attorney, Agent, or Firm*—Schuyler, Banner, Birch, McKie & Beckett

[57] ABSTRACT

A feed device (101) for supplying free-flowing material to a bucket container (136) is supported for rotation on an axle (102) and suitably has four radially extending feed chambers (103). The feed chambers (103) each have a feed outlet (110) at their free end for supplying free-flowing material to the container (136) moving in synchronism below the device. The feed outlet (110) in use, passes into the container and has a bottom plate (112) which defines a feed direction transverse to a radius extending from the axis of rotation of the feed device to the outlet so that material is dispensed from the feed chamber only when the feed outlet is disposed within the container.

8 Claims, 12 Drawing Figures

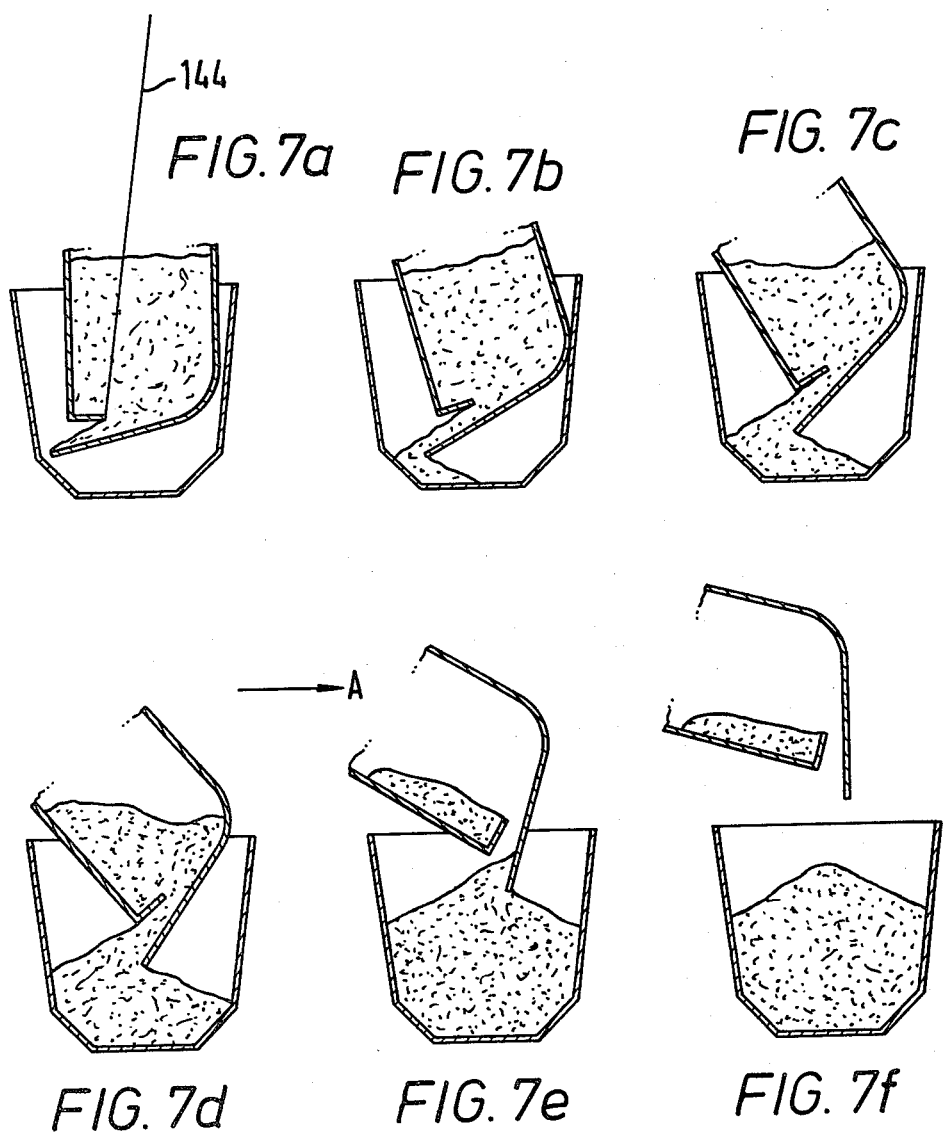

FEED DEVICE AND METHOD FOR SUPPLYING FREE-FLOWING MATERIAL TO A CONTAINER

This invention relates to a feed device for supplying free-flowing material to a container and to a method of supplying free-flowing material to a container incorporating such a device.

In one prior arrangement described in United Kingdom Patent Specification No. 1,521,967 a conveyor system for granular material is disclosed which includes a plurality of spaced bucket containers suspended between two parallel endless chains. In order to fill the buckets with granular material the chain is collapsed at a filling station so that a number of buckets touch one another and then granular material is dispensed from a stationary hopper above. In order to prevent material from falling between adjacent buckets each bucket has a rear lip which overhangs the front rim of the next adjacent bucket. A disadvantage of that arrangement is that with unconsolidated material a considerable amount of dust is created by the gravity fall which results in an undesirable atmosphere at and about the filling station and also a wastage of material. Moreover, the continuous collapsing and extending of the chain is a possible cause for breakdown of the conveyor system at the filling station.

In an another prior disposal disclosed in United Kingdom Patent Specification No. 1,553,477 there is described an apparatus for transporting mined material from the sea bed. The apparatus comprises a flexible carrier in the form of a hose which is divided into container sections each having a load chamber for a batch of solid material and a float chamber. Each container section has an opening to the load chamber and is supplied with material by a supply drum. The supply drum has four radially extending chambers having outlet openings which, on rotation of the drum, are successively brought into registration with the openings of the container sections to supply material to the load chamber and air to the float chamber. Whilst that arrangement means that no collapsing of the conveyor is required to drum outlets are such that material will begin to be discharged from the radial chambers long before they register with the respective container sections. Consequently, the arrangement is susceptible to considerable loss of material and, if used with dusty granular material, would also suffer from the same disadvantage as the existing arrangement discussed above.

Another arrangement incorporating a rotary device is disclosed in United Kingdom Patent Specification No. 1,275,425. In that proposal the device is divided into several sector-shaped compartments normally closed by a trap door. The rotational speed of the device is synchronised with the speed of a conveyor passing below and, right above a container carried by the conveyor, a trap door to a compartment opens and allows an article to fall by gravity into the container. Whilst this arrangement ensures that the compartment is above the container before the article is discharged, for use with granular material, it provides no real advantage over the system already in use described above in relation to specification No. 1,521,967. If the device is disclosed in No. 1,275,425 were to be used with dusty granular material the same dust and loss problems would be present as discussed in relation to No. 1,521,967 because the positional relationship of the feed device and container are equivalent in both cases.

An object of the present invention therefore, is to provide an improved feed device for feeding free-flowing material into a container such that when used with dusty materials the creation of dust will be substantially reduced as compared with previous arrangements.

Therefore, according to the present invention there is provided a feed device for supplying free-flowing material to a container comprising means for supporting the feed device for angular movement about an axis and at least one feed chamber having a feed outlet for supplying free-flowing material to a container moving in synchronism with the feed device, the device being characterised in that, in use, the feed outlet passes into the container, and material is dispensed from the feed chamber only when the feed outlet is disposed within the container.

Preferably, in order to prevent material being dispensed from the feed outlet until it is disposed within the container, the feed outlet is arranged so as to provide a feed direction which is transverse to a radius extending from the axis of the feed device to the feed outlet.

In a preferred arrangement the feed device comprises a plurality of substantially radially projecting feed chambers equally spaced about the axis of the device.

According with another aspect of the invention there is provided a method of supplying free-flowing material to a container comprising the steps of providing a rotatable feed device including at least one feed chamber having a feed outlet and supplying free-flowing material to the chamber, the method being characterised by the steps of rotating the feed device so that the feed outlet passes into a container moving in synchronism relative to the feed device, and dispensing free-flowing material from the feed chamber only when the feed outlet is disposed within the container.

Preferably material is dispensed from the feed outlet in a feed direction transverse to a radius extending between the axis of the feed device and the feed outlet. Thus, by reducing the gravity fall of the material, the creation of dust with granular materials is considerably reduced. Preferably the feed chamber, in use, projects into the container so as to dispense material from the feed outlet at a position as close as possible to the bottom of the container or the surface of the already dispensed material. Accordingly, in order to avoid the conveyor and feed device becoming jammed it is preferable to delay dispensing material until the feed chamber has reached a position in which the distance between the feed chamber and the bottom of the container is least. This means that, in the preferred arrangement, dispensing of the free-flowing material is not begun until a radius extending between the axis of rotation of the feed device and the feed outlet is substantially perpendicular to the direction of movement of the container.

The invention also includes apparatus for filling a plurality of containers with a free-flowing material comprising a feed device for the material supported for rotation about an axis, a plurality of substantially radially extending feed chambers equally spaced about the axis, means for supplying free-flowing material to the feed chambers, a feed outlet at the free end of each feed chamber, a conveyor for passing a plurality of containers below the feed device, and means to synchronise the movement of the conveyor and the rotation of the feed device, characterised in that the feed outlets define a feed direction for material transverse to the radial axis of the respective feed chamber, and the feed device and the conveyor are so mutually arranged that, in use, rotation of the feed device sequentially causes the feed chambers to pass in turn into containers carried by the conveyor and to deliver free-flowing material thereto only when the feed chambers are disposed within the respective containers.

The invention will now be described by way of example with reference to the accompanying drawings in which:

FIGS. 7a to 7f illustrate material being fed from the device into a bucket container and is applicable to both embodiments.

Figure 1:
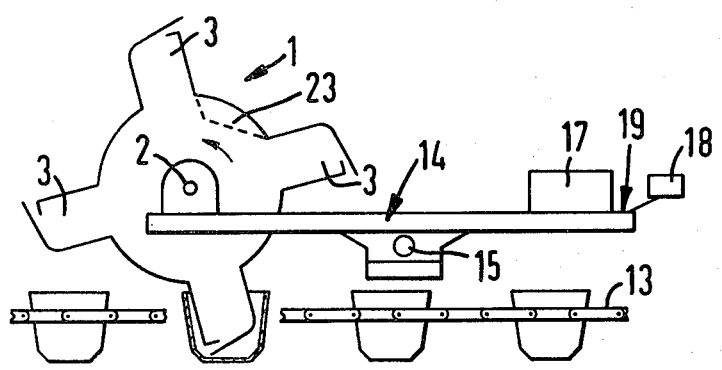
FIG. 1 is a front elevation of a feed device in accordance with the invention arranged to feed material to the spaced buckets of a bucket conveyor.
Figure 2:
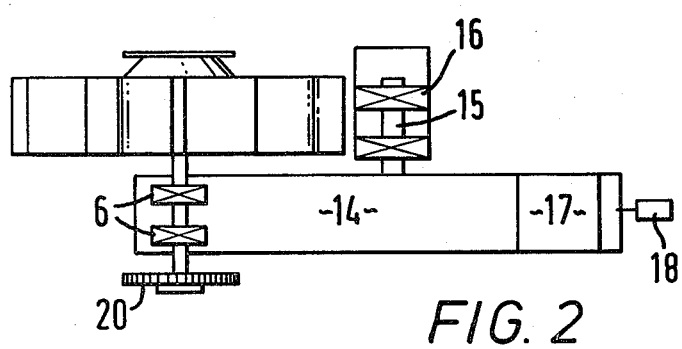
FIG. 2 is a plan view of the feed device.

In the drawings of the first embodiment a feed device 1 for free-flowing material is mounted for rotation about an axis of rotation 2 and has four diametrically opposed, projecting radial feed chambers 3 equally spaced about the periphery of the device. As seen from FIG. 3, the feed device is supported for rotation by means of a projecting shaft 4 secured to a strengthening cone 5 on one side of the feed device and mounted in bearings 6. The other side of the feed device 1 makes sealing contact with a fixed inlet/outlet assembly 7, the seals 22 being for example of synthetic rubber material such as neoprene.

The inlet/outlet assembly 7 consists of a particulate material inlet 8 which supplies material substantially centrally within the feed device and a suction outlet 9 for extracting dust from within the feed device.

Figure 4:
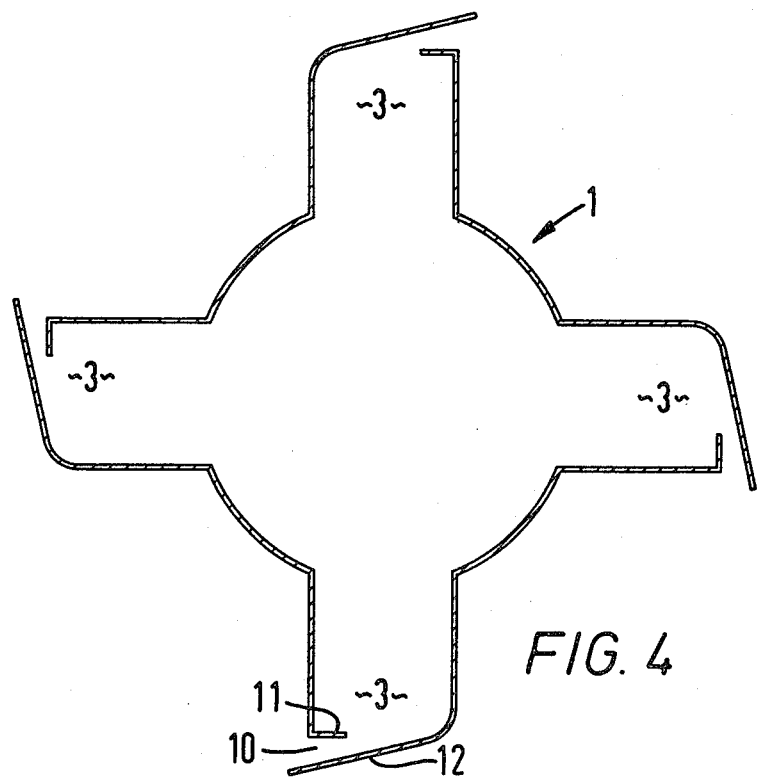
FIG. 4 is a cross-section of the feed device in a plane perpendicular to its axis of rotation.

Turning now to FIG. 4, which shows the detail of the feed chambers 3, it will be seen that each chamber 3 has a feed outlet 10 defined by a short perpendicular flange 11 secured to one side wall and an elongate inclined bottom 12 secured to the opposed side wall of the chamber.

Figure 3:
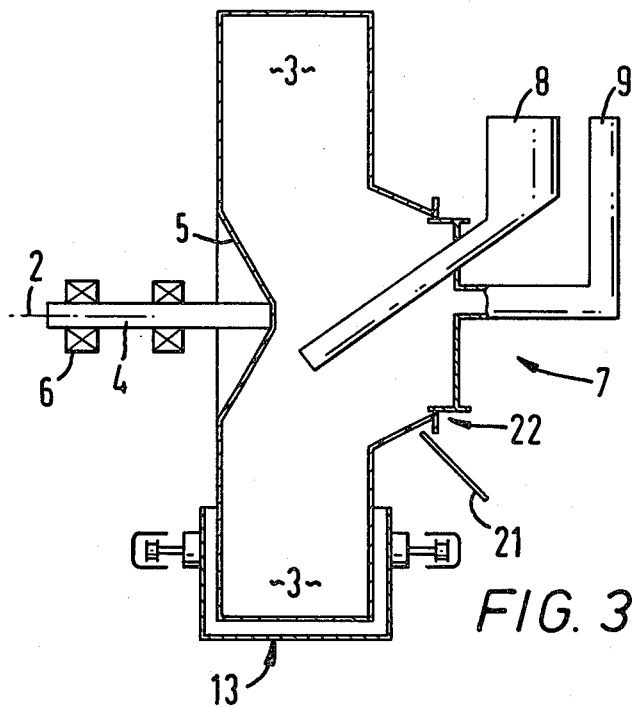
FIG. 3 is a cross-section of the feed device in a plane containing its axis of rotation.

When used in conjunction with a bucket elevator or conveyor 13 as shown in FIGS. 1 and 3 the feed device 1 is supported on one end of a fulcrum device 14 pivotally mounted at 15 in bearings 16. The other end of the fulcrum device 14 has a counterbalance 17 and is operably connected with a micro-switch 18 the purpose of which will be explained below. In order to prevent anti-clockwise rotation about pivot 15 beyond the position shown in FIG. 1 a stop device, indicated by arrow 19, is provided.

The drive for effecting rotation of the feed device 1 is by means of driving sprocket 20 which is connected by a chain drive to the drive motor of the bucket conveyor 13 so as to be synchronised therewith. Alternatively the feed device 1 and conveyor 13 may have separate drives suitably synchronised.

Figure 5:
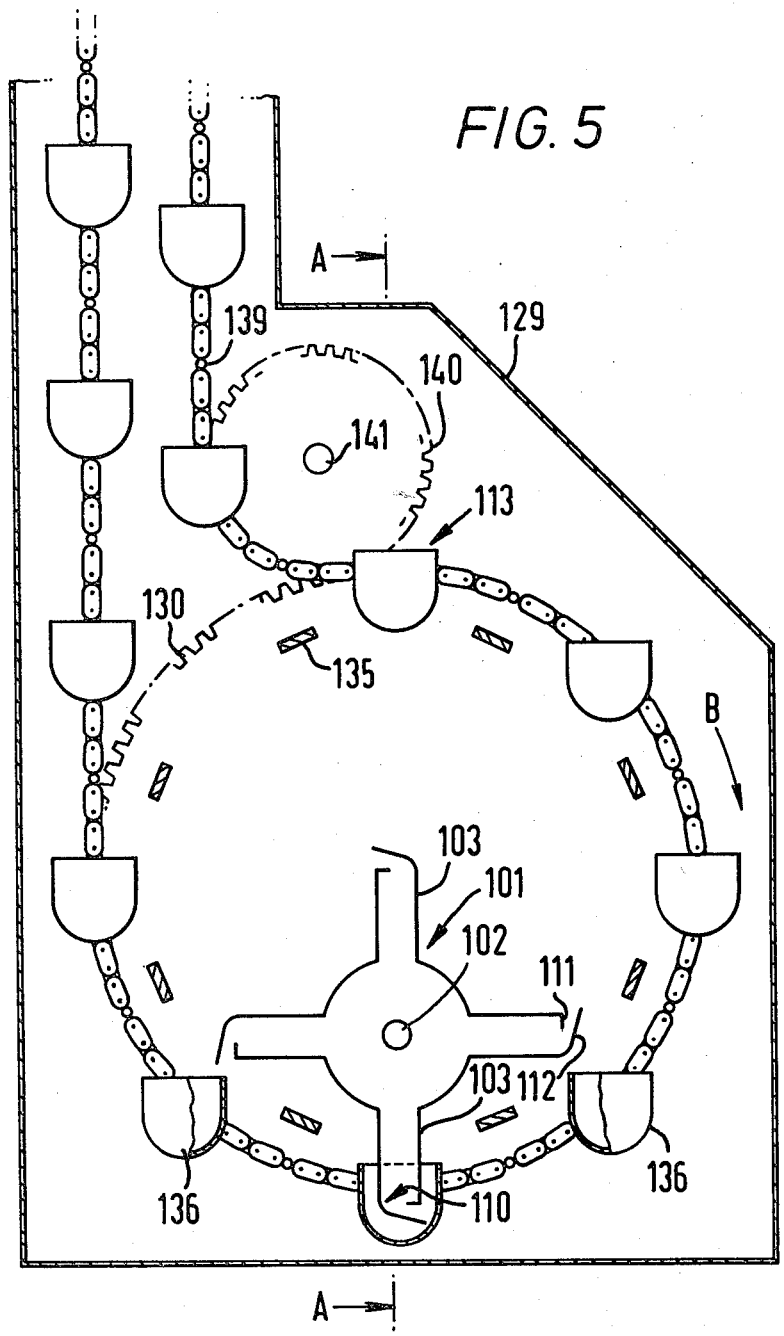
FIG. 5 is a diagrammatic sectional side elevation of a second embodiment on B—B in FIG. 6.
Figure 6:
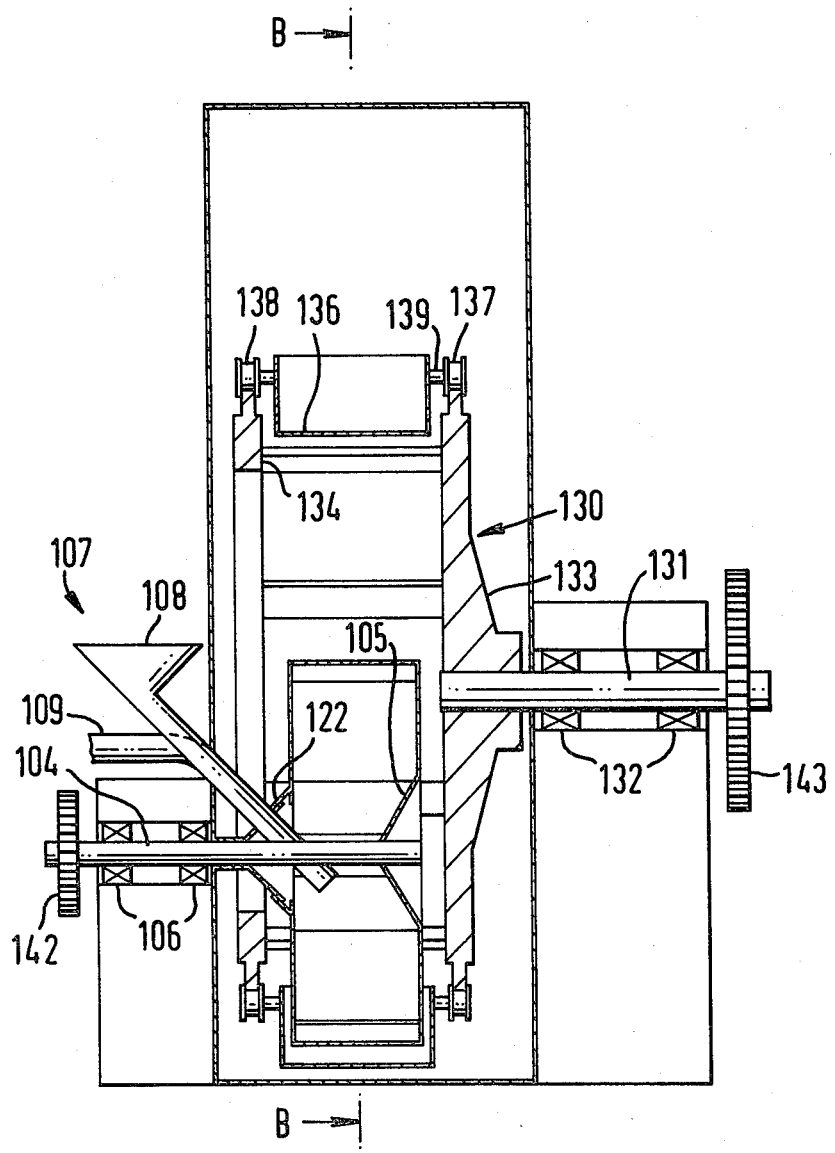
FIG. 6 is a section on A—A in FIG. 6.

In the second embodiment shown in FIGS. 5 and 6 the feed device is similar and therefore the same reference numerals in a one hundred series have been used for the same parts. However, in the second embodiment, the conveyor path moving in the direction of arrow B in FIG. 5 is more compact at the feed station than the arrangement shown in the first embodiment.

In the second embodiment the feed device 101 is disposed in a housing 129 and is supported for rotation about an axis 102 at the bottom of the conveyor path. The feed device 101 is positioned within a large sprocket wheel device 130 for the conveyor. The sprocket wheel device 130 includes axle 131 and is supported for rotation in bearings 132. The axle 131 is secured to the centre of a main sprocket wheel 133 which, in turn, is secured to a spaced sprocket ring 134 by tie bars 135.

The conveyor 113 has a plurality of bucket containers 136 pivotally mounted between two parallel endless chains 137, 138 which engage respectively with the main sprocket wheel 133 and sprocket ring 134. The two chains 137, 138 are interconnected by tie rods 139 positioned intermediate adjacent buckets 136 and preferably there are two chain links between each tie rod and the adjacent buckets 136. The conveyor 113 follows the path indicated by arrow B in FIG. 5 and, in order to accommodate the change of direction onto the sprocket wheel device 130, a pair of smaller sprocket wheels 140 are supported for rotation upon shaft 141.

The feed device 101 itself is similar to the arrangement described in the first embodiment except that there is no fulcrum device. The feed outlet 110 to the feed chambers 103 are the same in so far as they each include a short perpendicular flange 111 secured to the trailing side wall, with respect to the direction of rotation of the feed device 101, and an elongate inclined bottom 112 secured to the leading side wall. This arrangement defines a feed direction which is transverse to the radial axis of the feed chamber 103.

In order to synchronise the rotation of the feed device 101 the conveyor 113 the shaft 104 supporting the feed device 101 carries a gear wheel 142 which, through appropriate gearing (not shown), is connected to a gear wheel 143 secured to the axle 131 of the sprocket wheel device 130. With the arrangement shown the ratio is preferably 2:1.

In use, as the feed device 1, 101 rotates and material is supplied through inlet 8, 108, the projecting feed chambers 3, 103 pass into and out of the buckets of the conveyor 13, 113 as the conveyor moves in the direction of arrow A in FIGS. 1, 5 and 7a to 7f. As a feed chamber 3, 103 moves into a bucket, material within the chamber is prevented from escaping by the bottom 12 until a position beyond that shown in FIG. 7a is reached: ie once the natural angle of repose of the material is exceeded which in the illustrated case is when the feed chamber is substantially vertical. This can be more precisely defined with reference to FIG. 7a as stating that the delivery of material does not begin until the radius 144 extending between the axis of rotation of the feed device and the feed outlet is substantially perpendicular to the direction of movement of the bucket container as indicated by arrow A. The actual angle of the bottom 12, 112 is dependent upon the angle of repose of the material being dispensed.

On continued rotation of the feed device and movement of the conveyor, particulate material flows into the bucket as illustrated in FIGS. 7b to 7f, the bucket being filled to the desired level when the feed outlet 10, 110 is disposed substantially centrally of the bucket thereby allowing the material to once again take up its natural angle of repose about the centre providing a balanced load. The flange 11, 111 holds back a certain amount of material and prevents further material being supplied once the feed outlet has lost contact with the material already in the bucket.

In the first embodiment the fulcrum device 14 constitutes a safety device in case a full bucket unintentionally passes to the feed device. In this case the feed device 1 will be pivoted about 15 and the micro-switch 18 will be actuated to stop the conveyor and the feed device so that the fault can be rectified immediately. The inlet pipe 8 terminates substantially with reference to FIG. 7a centrally within the feed device to permit pivoting without damage. A deflector plate 21 is provided adjacent the neoprene seals 22 to collect any material that may escape during pivoting. If desired a similar arrangement may be provided with the embodiment of FIGS. 5 and 6.

The main advantage of the present invention is that dust previously generated by gravity fall of particulate material into the buckets is now mainly generated within the feed device 1, 101 and so can be extracted through the suction outlet 9, 109. The feed device, on delivering the material to the bucket containers, almost places the material on the bottom of the container or the surface of material already delivered so that dust is substantially eliminated at this stage. Moreover, because material is not dispensed until the respective feed chamber 3, 103 is in a substantially vertical position the device can be stopped and started as desired without fear of jamming.

Preferably the supply of material to the feed device is continuous and, in order to encourage material to pass into a trailing feed chamber once an operative feed chamber has started filling a respective bucket, sloping surface are provided between feed chambers (as illustrated by way of example in FIG. 1 by dotted line 23). The feed chambers can be dimensioned to fill or partially fill a bucket and the chambers themselves can be filled or partially filled before discharge as desired.

Although the present invention is primarily designed for feeding sedimentary material, such as sand, to a bucket conveyor it will be understood that the same device could be used for supplying any free-flowing material into a succession of containers other than buckets eg: cardboard boxes.

Also although four feed chambers are shown any number may be provided, the spacing between buckets or the speed of rotation of the feed device being altered accordingly. Moreover, although it is preferred to include a flange 11, 111 at the feed outlet this may be excluded if desired.

I claim:

1. A feed device for supplying free-flowing material to a container comprising means for supporting the feed device for angular movement about an axis, at least one feed chamber projecting outwardly from the axis of the device, and a feed outlet at the end of the feed chamber remote from said axis for supplying free-flowing material to a container moving in synchronism with the feed device, said feed outlet being defined by wall portions of the feed chamber which provide a feed direction which is transverse to a radius extending from the axis of the feed device to the feed outlet such that in use, the feed outlet passes into the container, material is dispensed from the feed chamber only when the feed outlet is disposed within the container, and the feed outlet is closed by the material during filling.

2. A feed device according to claim 1 wherein the feed device comprises a plurality of substantially radially projecting feed chambers equally spaced about the axis of the device.

3. A feed device according to claim 1 wherein the feed device is supported upon a fulcrum device enabling the feed device to pivot in the event of possible jamming.

4. A feed device according to claim 1 wherein the feed chamber includes a generally radially extending chamber wall or walls having a leading side and the said wall portions of the feed chamber defining the trailing side with respect to the direction of rotation of the feed device, feed outlet comprising a first end wall extending inwardly from the trailing side of the chamber wall, a second end wall extending inwardly from the leading side of the chamber wall and having a portion thereof radially outward of the first end wall so as to define said transverse feed direction.

5. A method of supplying free-flowing material to a container comprising the steps of providing a rotatable feed device including at least one feed chamber having a feed outlet, supplying free-flowing material to the feed chamber, rotating the feed device so that the feed chamber passes into a container moving in synchronism relative to the feed device and dispensing free-flowing material from the feed chamber by providing the feed outlet with a feed direction transverse to the radius extending between the axis of the feed device and the feed outlet whereby material is not supplied to the container until the feed outlet is disposed within the container and whereby the feed outlet is closed by the material during filling.

6. A method of supplying free-flowing material to a container according to claim 5 wherein dispensing of the free-flowing material is not begun until a radius extending between the axis of rotation of the feed device and the feed outlet is substantially perpendicular to the direction of movement of the container.

7. A method of supplying free-flowing material to a container according to claim 5 or 6 comprising the additional step of extracting dust from the feed device.

8. Apparatus for filling a plurality of containers with a free-flowing material comprising a feed device for the material supported for rotation about an axis, a plurality of substantially radially extending feed chambers equally spaced about the axis, means for supplying free-flowing material to the feed chambers, a feed outlet at the free end of each feed chamber, a conveyor for passing a plurality of containers below the feed device, and means to synchronise the movement of the conveyor and the rotation of the feed device, characterized in that the feed outlets define a feed direction for material transverse to the radial axis of the respective feed chamber, and the feed device and the conveyor are so mutually arranged that, in use, rotation of the feed device sequentially causes the feed chambers to pass in turn into containers carried by the conveyor and to deliver free-flowing material thereto only when the feed chambers are disposed within the respective containers.

* * * * *